(12) United States Patent
Hettiarachchi et al.

(10) Patent No.: US 6,697,449 B2
(45) Date of Patent: Feb. 24, 2004

(54) TEMPERATURE-BASED METHOD FOR CONTROLLING THE AMOUNT OF METAL APPLIED TO METAL OXIDE SURFACES TO REDUCE CORROSION AND STRESS CORROSION CRACKING

(75) Inventors: Samson Hettiarachchi, Menlo Park, CA (US); Robert J. Law, Livermore, CA (US); David P. Siegwarth, San Jose, CA (US); Thomas P. Diaz, San Martin, CA (US); Robert L. Cowan, Livermore, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/118,926

(22) Filed: Apr. 10, 2002

(65) Prior Publication Data

US 2002/0181644 A1 Dec. 5, 2002

Related U.S. Application Data

(60) Continuation of application No. 09/408,504, filed on Sep. 30, 1999, now abandoned, which is a division of application No. 09/196,104, filed on Nov. 20, 1998.
(60) Provisional application No. 60/066,992, filed on Nov. 28, 1997.

(51) Int. Cl.$^7$ .................................................. G21C 9/00
(52) U.S. Cl. ....................................... 376/305; 376/306
(58) Field of Search ................................. 376/305, 306

(56) References Cited

U.S. PATENT DOCUMENTS 5,135,709 A  *  8/1992  Andresen et al. ........... 376/305
5,448,605 A       9/1995  Hettiarachchi ............... 376/305
5,581,588 A      12/1996  Andresen ..................... 376/305
5,602,888 A  *  2/1997  Hettiarachchi et al. ..... 376/305
5,608,766 A  *  3/1997  Andresen et al. ........... 376/305
5,625,656 A       4/1997  Hettiarachchi et al. ..... 376/245
5,818,893 A  * 10/1998  Hettiarachchi ............... 376/305
5,904,991 A  *  5/1999  Hettiarachchi ........... 428/472.1

FOREIGN PATENT DOCUMENTS

| EP | 0 450 444 A1 | | 10/1991 |
| EP | 0 514 089 A1 | | 11/1992 |
| EP | 0651073 | * | 3/1995 |
| EP | 0 651 073 A1 | | 5/1995 |
| EP | 0 651 397 a1 | | 5/1995 |
| EP | 0 671 476 A1 | | 9/1995 |
| EP | 0 671 485 A1 | | 9/1995 |
| EP | 0 707 319 A1 | | 4/1996 |
| EP | 0 731 191 A1 | | 9/1996 |
| EP | 0 736 878 A1 | | 10/1996 |
| WO | 96/00447 | | 1/1996 |
| WO | 97/40210 | | 10/1997 |

* cited by examiner

Primary Examiner—Michael J. Carone
Assistant Examiner—John Richardson
(74) Attorney, Agent, or Firm—Nixon & Vanderhye

(57) ABSTRACT

Method for controlling the amount of metal atoms deposited into an oxide layer present on a metal surface, which metal atoms increase the corrosion resistance of metal when present in the oxide film, wherein the metal surface is submerged in water at a selected temperature within the range of about to 200° to 550° F.; and a solution of a compound containing the metal which increases the corrosion resistance of the metal surface when present in the oxide film is injected into the water. The compound decomposes at the selected temperature to release atoms of the metal which incorporate in the oxide film at a desired loading.

19 Claims, 9 Drawing Sheets

TEMPERATURE-BASED METHOD FOR CONTROLLING THE AMOUNT OF METAL APPLIED TO METAL OXIDE SURFACES TO REDUCE CORROSION AND STRESS CORROSION CRACKING

This is a con of Ser. No. 09/408,504 Sep. 30, 1999 ABN, which is a Div of Ser. No. 09/196,104 Nov. 20, 1998 which claims benefit of 60/066,992 Nov. 28, 1997

FIELD OF THE INVENTION

This invention relates generally to reducing the corrosion potential of components exposed to high-temperature water. More specifically, the invention relates to a temperature-based method for controlling the amount of noble metals deposited in boiling water reactors and components thereof to provide selected loading of metal species on the component surfaces.

BACKGROUND OF THE INVENTION

Nuclear reactors are used in central-station electric power generation, research and propulsion. A reactor pressure vessel contains the reactor coolant, i.e. water, which removes heat from the nuclear core. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental-and radiation conditions.

Some of the materials exposed to high-temperature water include carbon steel, alloy steel, stainless steel, nickel-based, cobalt-based and zirconium-based alloys. Despite careful selection and treatment of these materials for use in water reactors, corrosion occurs in the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in reactor components, such as structural members, piping, fasteners and welds exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

It is well known that SCC occurs at higher rates when oxygen is present in the reactor water in concentrations of about 5 ppb or greater. SCC is further increased in a high radiation flux where oxidizing species, such as oxygen, hydrogen peroxide, and short-lived radicals, are produced from radiolytic decomposition of the reactor water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

In a BWR, the radiolysis of the primary water coolant in the reactor core causes the net decomposition of a small fraction of the water to the chemical products $H_2$, $H_2O_2$, $O_2$ and oxidizing and reducing radicals. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote intergranular stress corrosion cracking (IGSCC) of susceptible materials of construction. One method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species to reform water, thereby lowering the concentration of dissolved oxidizing species in the water in the vicinity of metal surfaces. The rate of these recombination reactions is dependent on local radiation fields, water flow rates and other variables.

The injected hydrogen reduces the level of oxidizing species in the water, such as dissolved oxygen, and as a result lowers the ECP of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the ECP below a critical potential required for protection from IGSCC in high-temperature water. As used herein, the term "critical potential" means a corrosion potential at or below a range of values of about −0.230 to −0.300 V based on the standard hydrogen electrode (SHE) scale. IGSCC proceeds at an accelerated rate in systems in which the ECP is above the critical potential, and at a substantially lower or zero rate in systems in which the ECP is below the critical potential. Water containing oxidizing species such as oxygen increases the ECP of metals exposed to the water above the critical potential, whereas water with little or no oxidizing species presents results in an ECP below the critical potential.

Corrosion potentials of stainless steels in contact with reactor water containing oxidizing species can be reduced below the critical potential by injection of hydrogen into the water so that the dissolved hydrogen concentration is about 50 to 100 ppb or greater. For adequate feedwater hydrogen addition rates, conditions necessary to inhibit IGSCC can be established in certain locations of the reactor. Different locations in the reactor system require different levels of hydrogen addition. Much higher hydrogen injection levels are necessary to reduce the ECP within the high radiation flux of the reactor core, or when oxidizing cationic impurities, e.g., cupric ion, are present.

It has been shown that IGSCC of Type 304 stainless steel (composition in weight % 18.0–20.0 Cr, 8.0–10.0 Ni, 2.00 Mn, 1.0 Si, 0.08 C, 0.08 S, 0.045 P) used in BWRs can be mitigated by reducing the ECP of the stainless steel to values below −0.230 V(SHE). An effective method of achieving this objective is to use HWC. However, high hydrogen additions, e.g., of about 200 ppb or greater, that may be required to reduce the ECP below the critical potential, can result in a higher radiation level in the steam-driven turbine section from incorporation of the short-lived N-16 species in the steam. For most BWRS, the amount of hydrogen addition required to provide mitigation of IGSCC of pressure vessel internal components results in an increase in the main steam line radiation monitor by a factor of five. This increase in main steam line radiation can cause high, even unacceptable, environmental dose rates that can require expensive investments in shielding and radiation exposure control. Thus, recent investigations have focused on using minimum levels of hydrogen to achieve the benefits of HWC with minimum increase in the main steam radiation dose rates.

An effective approach to achieve this goal is to either coat or alloy the stainless steel surface with palladium or any other platinum group metal. The presence of palladium on the stainless steel surface reduces the hydrogen demand to reach the required IGSCC critical potential of −0.230 V(SHE). The techniques used to date for palladium coating include electroplating, electroless plating, plasma deposition and related high-vacuum techniques. Palladium alloying has been carried out using standard alloy preparation techniques. Both of these approaches are ex situ techniques in that they cannot be practiced while the reactor is in operation.

U.S. Pat. No. 5,135,709 to Andresen et al. discloses a method for lowering the ECP on components formed from carbon steel, alloy steel, stainless steel, nickel-based alloys or cobalt-based alloys which are exposed to high-temperature water by forming the component to have a catalytic layer of a platinum group metal. As used therein, the term "catalytic layer" means a coating on a substrate, or a solute in an alloy formed into the substrate, the coating or solute being sufficient to catalyze the recombination of oxidizing and reducing species at the surface of the substrate. As used herein, the term "platinum group metal" means metals from the group consisting of platinum, palladium, osmium, ruthenium, iridium, rhodium, and mixtures thereof.

In nuclear reactors, ECP is increased by higher levels of oxidizing species, e.g., up to 200 ppb or greater of oxygen in the water measured in the circulation piping, from the radiolytic decomposition of water in the core of the nuclear reactor. The method disclosed in U.S. Pat. No. 5,135,709 further comprises providing a reducing species in the high-temperature water that can combine with the oxidizing species. In accordance with this known method, high concentrations of hydrogen, i.e., about 100 ppb or more, must be added to the water to provide adequate protection to materials outside the reactor core region, and still higher concentrations are needed to afford protection to materials in the reactor core.

The formation of a catalytic layer of a platinum group metal on an alloy from the aforementioned group catalyzes the recombination of reducing species, such as hydrogen, with oxidizing species, such as oxygen or hydrogen peroxide, that are present in the water of a BWR. Such catalytic action at the surface of the alloy can lower the ECP of the alloy below the critical potential where IGSCC is minimized. As a result, the efficacy of hydrogen additions to high-temperature water in lowering the ECP of components made from the alloy and exposed to the injected water is increased many-fold. Furthermore, it is possible to provide catalytic activity at metal alloy surfaces if the metal substrate of such surfaces contains a catalytic layer of a platinum group metal. Relatively small amounts of the platinum group metal are sufficient to provide the catalytic layer and catalytic activity at the surface of the metal substrate. For example, U.S. Pat. No. 5,135,709 teaches that a solute in an alloy of at least about 0.01 wt. %, preferably at least 0.1 wt. %, provides a catalytic layer sufficient to lower the ECP of the alloy below the critical potential. The solute of a platinum group metal can be present up to an amount that does not substantially impair the metallurgical properties, including strength, ductility, and toughness of the alloy. The solute can be provided by methods known in the art, for example by addition to a melt of the alloy or by surface alloying. In addition, a coating of the platinum group metal, or a coating of an alloy comprised of a solute of the platinum group metal as described above, provides a catalytic layer and catalytic activity at the surface of the metal. Suitable coatings can be deposited by methods well known in the art for depositing substantially continuous coatings on metal substrates, such as plasma spraying, flame spraying, chemical vapor deposition, physical vapor deposition processes such as sputtering, welding such as metal inert gas welding, electroless plating, and electrolytic plating.

Thus, lower amounts of reducing species such as hydrogen are effective in reducing the ECP of the metal components below the critical potential, because the efficiency of recombination of oxidizing and reducing species is increased many-fold by the catalytic layer. Reducing species that can combine with the oxidizing species in the high-temperature water are provided by conventional means known in the art. In particular, reducing species such as hydrogen, ammonia, or hydrazine are injected into the feedwater of the nuclear reactor.

A need exists to provide for improved control over the deposition of metals on the surface of components. The present invention seeks to satisfy that need.

SUMMARY OF THE INVENTION

It has been discovered, according to the present invention, that it is possible to control the amount of metal species deposited on metal surfaces by carefully controlling the water temperature into which the metal is introduced within a particular temperature range. According to another aspect, it has been discovered, according to this invention, that by careful selection of the water temperature, metal concentration and time, it is possible to control the deposit ratio of a particular metal from a mixture of metals.

As a result of the invention, it is possible to achieve further improvement of the corrosion resistance of metal surfaces which are typically disposed in high temperature water. It has been found, for example, that unexpectedly increased loading of the deposited metal occurs when the temperature of the water is selected to be within the range of about 200° F. to 550° F., more particularly within the range of about 300° F. to about 450° F., as compared to the loading obtained at temperatures above or below that range. The present invention allows for selection of a particular metal loading on the metal surface by selection of the appropriate water temperature into which the compound containing the metal species to be deposited is introduced. The deposited metal is typically a noble metal and is introduced in the absence of hydrogen or other added reducing agents. The method may be carried out in the presence of hydrogen and other reducing agents. The metal is added as a metal-containing compound which is introduced in an amount such that, upon decomposition of the metal-containing compound in the water, the metal atoms are released in an amount sufficient, when present on the metal surface, to reduce the electrochemical corrosion potential of the metal to a level below the critical potential, and thereby protect against intergranular stress corrosion cracking.

In one aspect, the invention provides a method for controlling the amount of metal atoms deposited into an oxide layer present on a metal surface which metal atoms increase the corrosion resistance of the metal surface when present in the oxide film. The method comprises submerging the metal surface in water at a selected temperature within the range of about to 2000 to 550° F., for example within the range of about 3000 to 450° F., and injecting a solution of a compound containing the metal which increases the corrosion resistance of the metal surface when present in the oxide film. The compound decomposes at the selected temperature to release atoms of the metal which incorporate in the oxide film.

In another aspect, there is provided a method for reducing corrosion of alloy components such as stainless steel components, in a water-cooled nuclear reactor or associated components, wherein a solution of a compound containing a metal is injected into the reactor water at a temperature of about to 200° to 550° F., for example about 300° to 450° F., in an amount such that, upon decomposition of the compound under the operating reactor thermal conditions, atoms of the metal compound are released at a rate such that the concentration of the metal in the water is sufficient, once incorporated on the alloy components, to reduce the electrochemical corrosion potential of the alloy components to a level below the critical potential. Hydrogen may be present at low levels, for example less than 400 ppb, more usually about 300–600 ppb. In this way, the alloy components are protected against intergranular stress corrosion cracking.

According to a further aspect, there is provided a method for controlling the deposit ratio of one noble metal versus a different noble metal from a mixture of noble metals on a metal surface carrying an oxide film, comprising immersing the metal surface in water at a temperature selected within the range of 200° to 550° F. and introducing a mixture of compounds containing the different noble metals, the compounds each having the property of decomposing in said water to release atoms of the respective noble metals which incorporate in the oxide film at a desired deposit ratio. Generally, for example, when the temperature is in the range of about 340 to 360° F., the metal atoms are deposited in an amount ranging from 0.01 $\mu g/cm^2$ to about 62 $\mu g/cm^2$.

Generally, the noble metals are platinum and rhodium, and the temperature is selected within the range of 200° to 550° F. For a platinum/rhodium mixture, the weight ratio within the temperature range of 200°–550° F. is typically from about 5:1 to about 40:1 platinum:rhodium.

In another aspect, there is provided an alloy component having on its surface an oxide film containing a selected amount of a metal capable of increasing the corrosion resistance of the alloy when incorporated in the oxide film. The metal species are incorporated in the oxide film by a process wherein the alloy is immersed in water at a selected temperature within the range of about to 200° to 550° F., for example about 300° to 450° F., in which the compound containing a metal is dissolved. The compound has the property that it decomposes in the high-temperature water to release atoms of the metal which incorporate in the oxide film at a particular loading level.

DETAILED DESCRIPTION OF PREFERRED EMBODIMENTS

Figure 1:
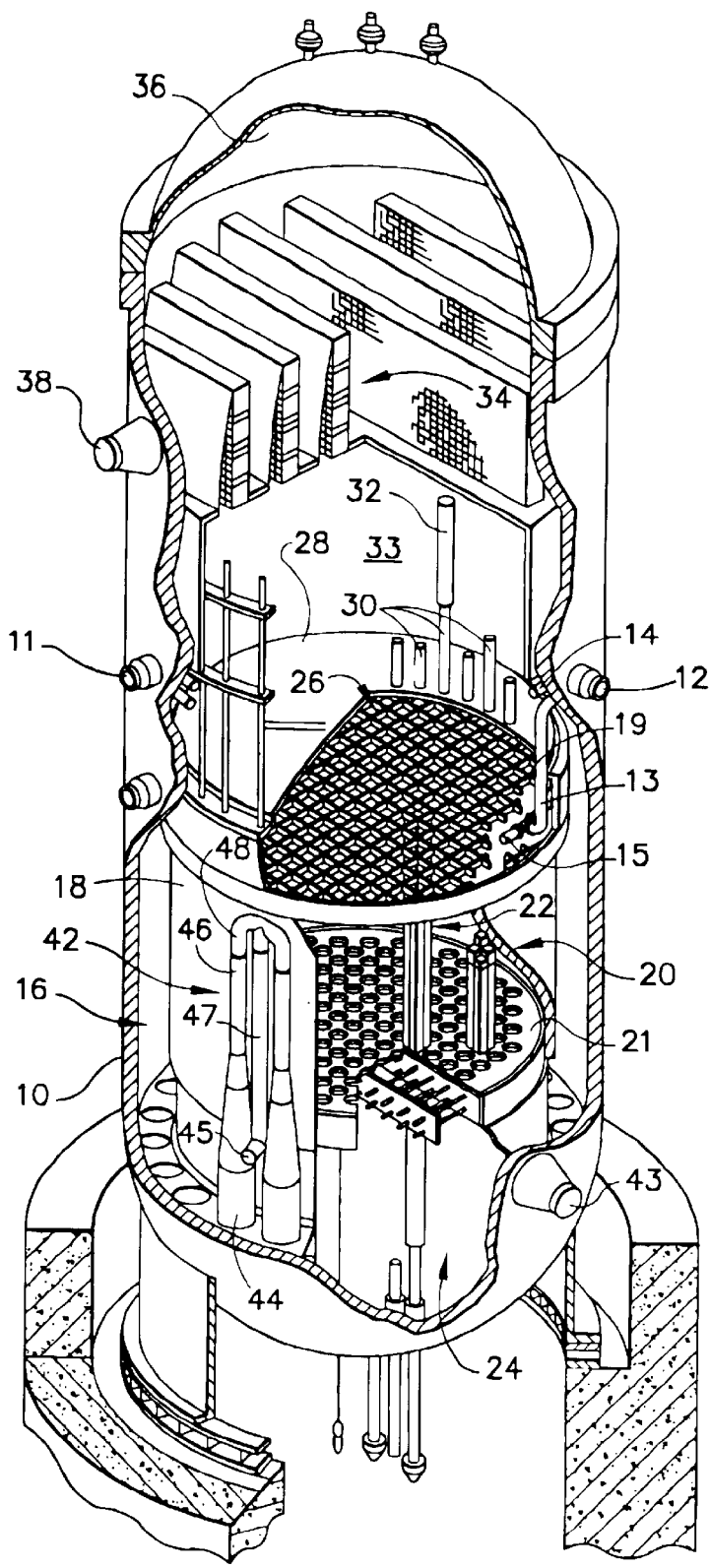
FIG. 1 is a schematic showing a partially cutaway perspective view of a conventional BWR.

The fluid flow in a boiling water reactor will be generally described with reference to FIG. 1. Feedwater is admitted into a reactor pressure vessel (RPV) 10 via a feedwater inlet 12 and a feedwater sparger 14, which is a ringshaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder which surrounds the core 20 comprising numerous fuel assemblies 22 (only two 2×2 arrays of which are depicted in FIG. 1). Each fuel assembly is supported at the top by top guide 19 and at the bottom by core plate 21. Water flowing through downcomer annulus 16 then flows to the core lower plenum 24.

The water subsequently enters the fuel assemblies 22 disposed within core 20, wherein a boiling boundary layer (not shown) is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers.

The present invention is based on the discovery that it is possible to control the amount of metals deposited on an oxided metal surface in high temperature water, as well as the ratio of metal deposit from a mixture of metals, by careful choice of the temperature of the water, concentration of the metal and time. In the following discussion, for convenience of description, reference will be made to the use of platinum as a typical noble metal. When mixtures are being considered, platinum and rhodium will be described for ease of reference. It is understood, however, that the invention is not limited to the use of platinum and rhodium, and other platinum group and/or non-platinum group metals may be used alone or as mixtures.

Compounds of the platinum group metals are preferred. The term "platinum group metal", as used herein, means platinum, palladium, osmium, ruthenium, iridium, rhodium and mixtures thereof. It is also possible to use compounds of non-platinum group metals, such as for example zinc, titanium, zirconium, niobium, tantalum, tungsten and vanadium. Mixtures of platinum group compounds may also be used. Mixtures of platinum group compounds and non-platinum group compounds may also be used in combination, for example platinum and zinc. The compounds may be organometallic, organic or inorganic and may be soluble or insoluble in water (i.e. may form solutions or suspensions in water and/or other media such alcohols and/or acids). Generally, when mixtures of platinum and non-platinum group metals are used, the platinum group metal is in excess of the other metal.

Examples of preferred platinum group metal compounds which may be used are palladium acetyl acetonate, palladium nitrate, palladium acetate, platinum acetyl acetonate, hexahydroxyplatinic acid, $Na_2Pt(OH)_6$, $Pt(NH_3)_4(NO_3)_2$, $Pt(NH_3)_2(NO_3)_2$, $K_3Ir(NO_2)_6$ and $K_3Rh(NO_2)_6$. Other examples are platinum(IV) oxide ($Pt(IV)O_2$), platinum(IV) oxide-hydrate ($Pt(IV)O_2.xH_2O$, where x is 1–10), rhodium (II) acetate ($Rh(II)ac_2$), Rh(III) nitrate ($Rh(III)(NO_3)_3$), rhodium(III) oxide ($Rh(III)_2O_3$), rhodium(III) oxide-hydrate ($Rh(III)_2O_3.xH_2O$, where x is 1–10), rhodium(II) phosphate ($Rh(III)PO_4$) and rhodium(III) sulphate ($Rh(III)_2(SO_4)_3$).

Examples of mixtures of the compounds which may be used are mixtures containing platinum and iridium, and platinum and rhodium. Use of such mixtures results in incorporation of noble metals on the oxided stainless steel surfaces of both noble metals. The presence of iridium or rhodium with the platinum gives good long-term durability. It has been found that a combination of about 40–80 ppb Pt and 10–35 ppb Rh, for example concentrations of about 60 ppb Pt and about 20 ppb Rh in water, provides good adherent properties over extended periods of time.

The metal compound may be injected in situ in the form of an aqueous solution or suspension, or may be dissolved in the water before the metal surface to be treated is introduced. As used in the claims hereafter, the term "solution" means solution or suspension. Solutions and suspensions may be formed using media well known to those skilled in the art. Examples of suitable media in which solutions and/or suspensions are formed, are water, alkanols such as ethanol, propanol, n-butanol, and acids such as lower carboxylic acids, e.g. acetic acid, propionic acid and butyric acid.

Figure 2A:
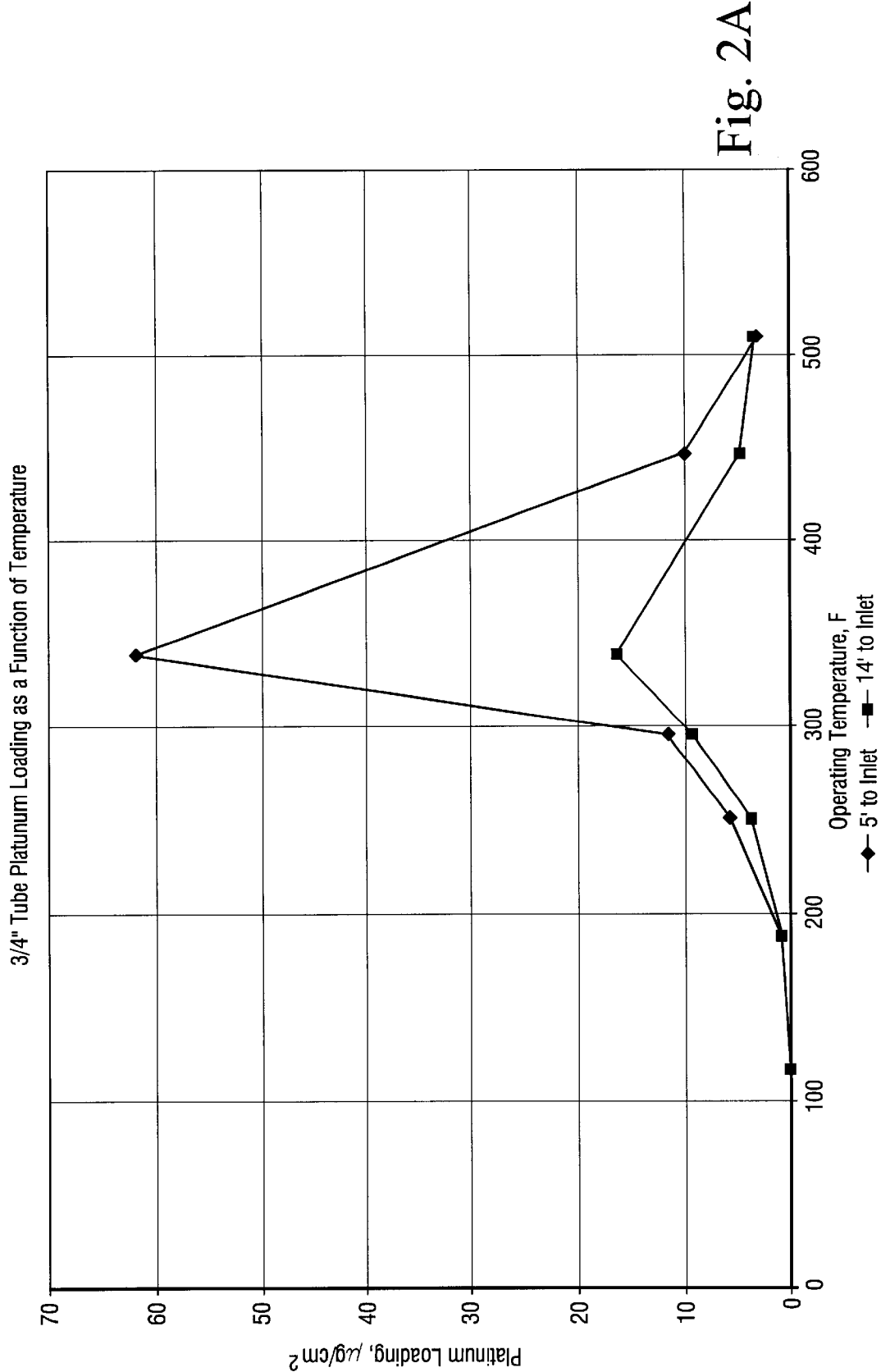
FIGS. 2A and 2B are plots showing respectively the variation of platinum and rhodium loading level versus water temperature.
Figure 2B:
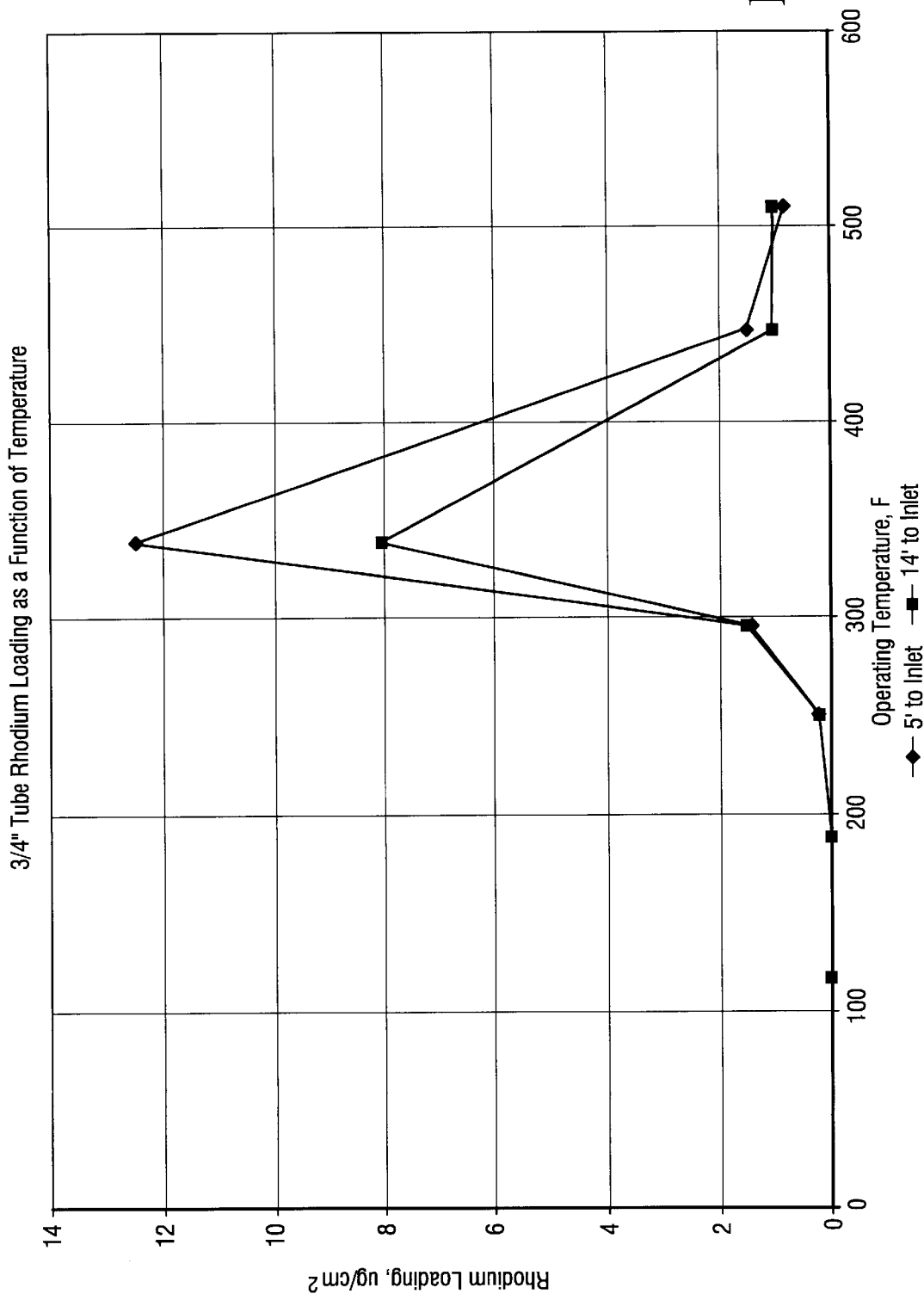

FIGS. 2A and 2B show the effect of variation of temperature on metal deposit loading rate as well as the effect of distance from the point of introduction of the compound to the region of deposit on the metal surface. As demonstrated in FIGS. 2A and 2B, surprisingly enhanced loading is observed over the temperature range of 200° to 500° F., more especially in the range of 300° to 450° F., and particularly at about 340° to 360° F. As seen from FIGS. 2A and 2B, the loading observed in the temperature range of 300 to 450° F. extends from about 10 $\mu g/cm^2$ at about 300° F. to a maximum of about 62 $\mu g/cm^2$ at about 340° F., and then drops off to about 10 $\mu g/cm^2$ and lower as the temperature rises towards 500° F. This peaking effect is surprising and affords the advantage that loading of the metal species on the metal surface can be controlled by careful selection of the water temperature and point of introduction of the metal to be deposited.

When the metal compound solution or suspension enters the high-temperature water, the compound decomposes very rapidly to produce atoms, which are incorporated into the metal (typically stainless steel) oxide film. In accordance with the process, only the solution or suspension of the compound is introduced into the high-temperature water initially. No further agents, such as hydrogen, other reducing agents, acids or bases are introduced into the high-temperature water when the compound solution or suspension is injected into and decomposes in the high-temperature water.

Figure 3:
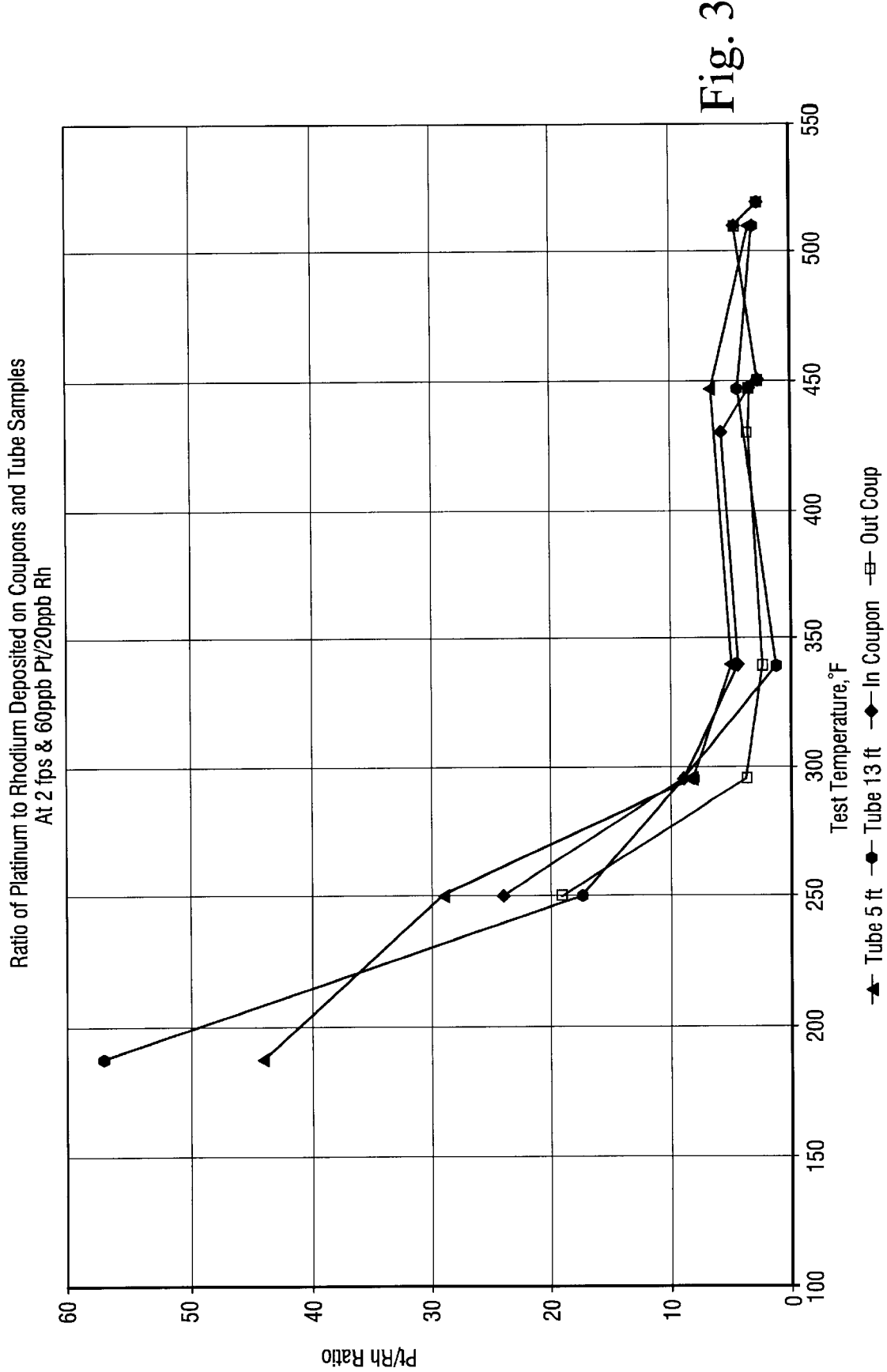
FIG. 3 is a plot showing the ratio of platinum to rhodium deposited as a function of temperature.

FIG. 3 shows the effect of temperature on the ratio of platinum and rhodium deposited on the metal surface. The presence of rhodium renders the deposit more durable. As the temperature reaches 300° to 500° F., the ratio of deposited platinum to rhodium drops to within the range of about 5:1 to 10:1. Thus, knowing this relationship, it is possible to control the ratio of platinum to rhodium in the deposited layer based on the prevailing temperature conditions of the water.

Figure 4:
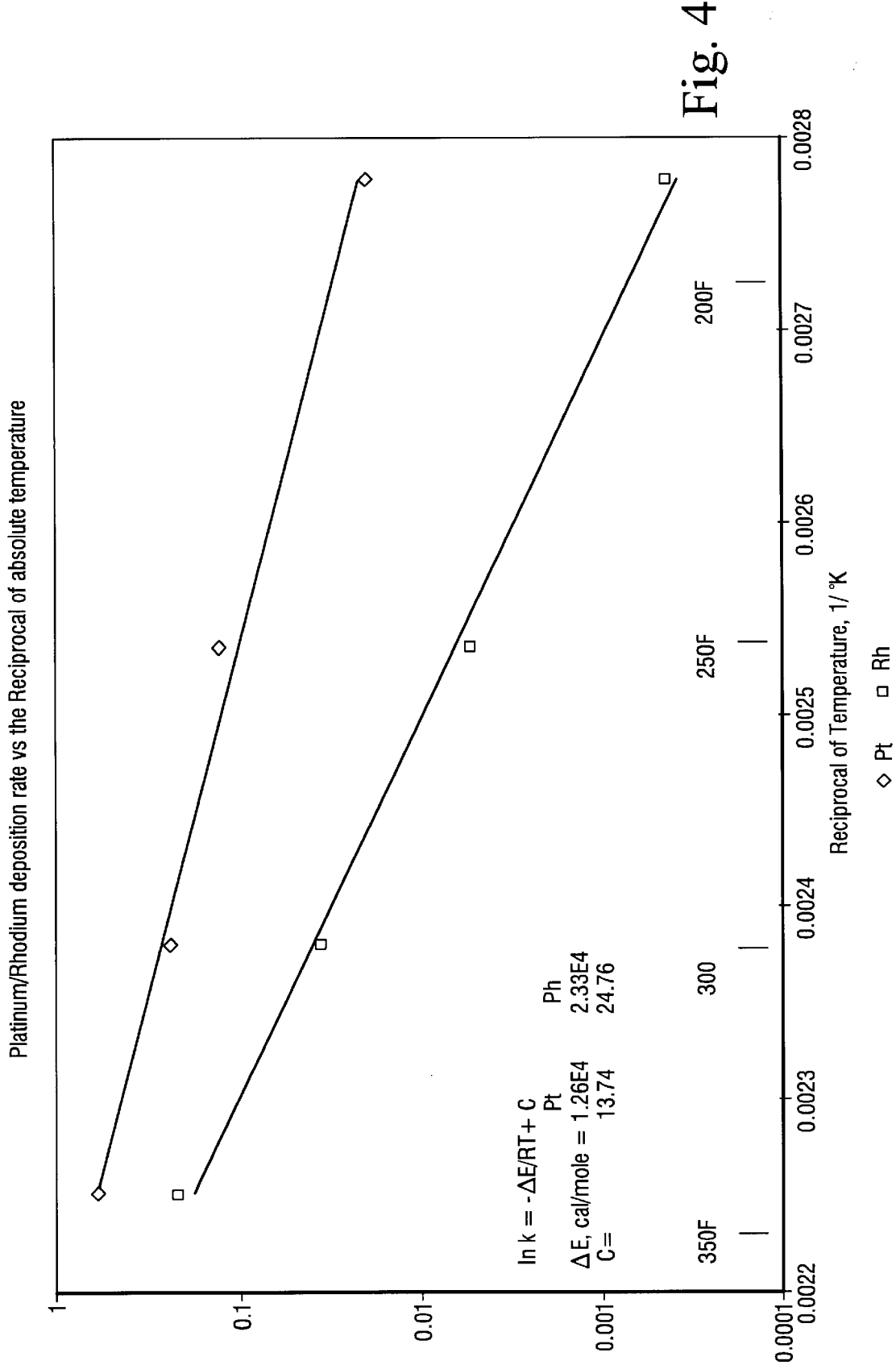
FIG. 4 shows a plot of the platinum/rhodium deposition rate as a function of the reciprocal of absolute temperature.
Figure 5:
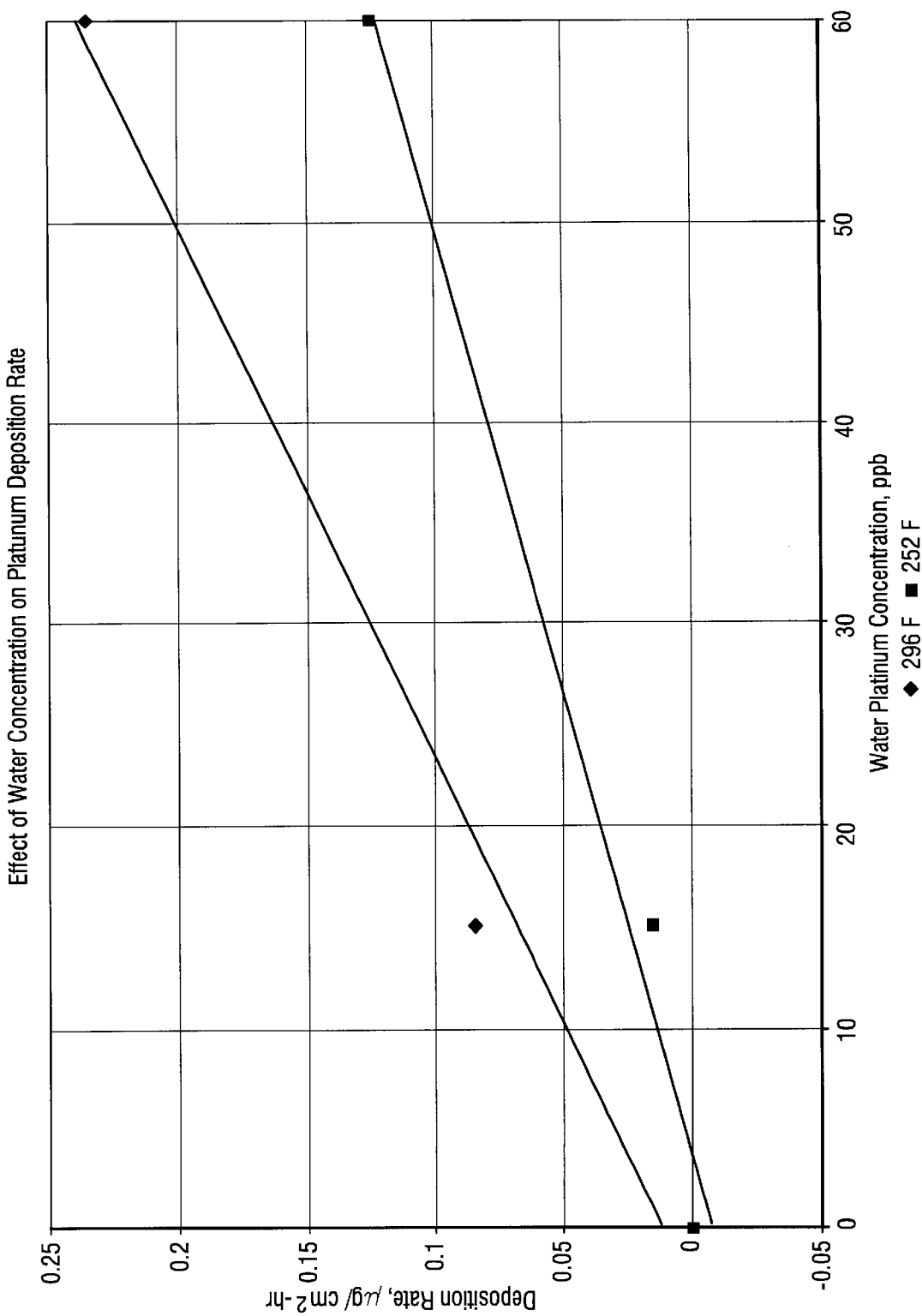
FIGS. 5 and 6 show the effect of platinum and rhodium concentration on platinum and rhodium deposition rate, respectively.
Figure 6:
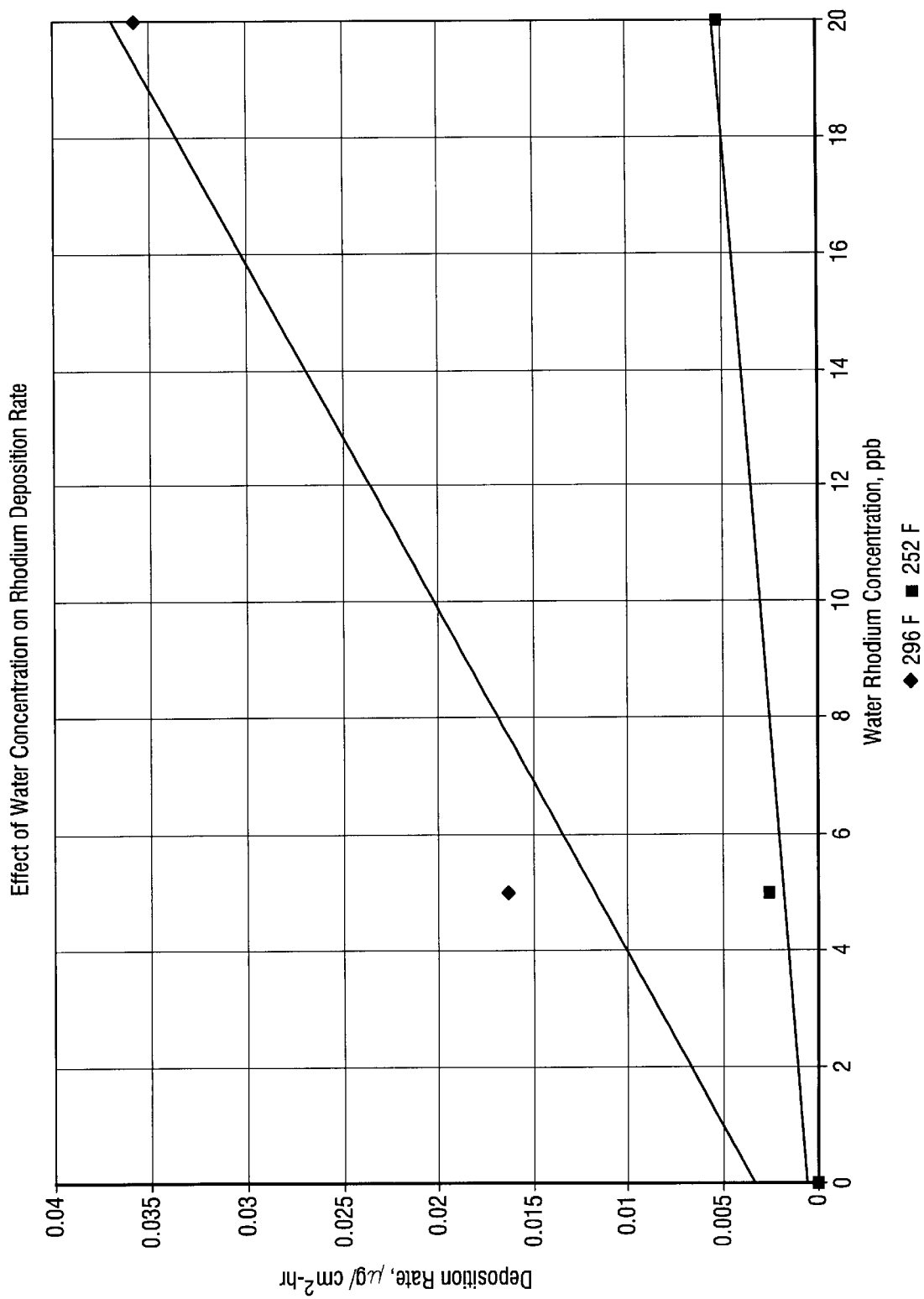

FIG. 4 shows that the deposition rate for a 60 ppb platinum and 20 ppb rhodium solution is a negative exponential with temperature in the 180 to 350° F. range. From this it is possible to predict the effect of temperature on the ratio of deposit of the metals and the time required to deposit a given quantity of noble metal in the oxide. Higher ΔE for rhodium indicates slower rhodium deposition rate. This figure can be used to select the conditions required to select the conditions required for depositing the desired platinum/rhodium ratio and quantity FIGS. 5 and 6 show that the deposition rate is approximately linear within the concentration range investigated (0–60 ppb).

Figure 7A:
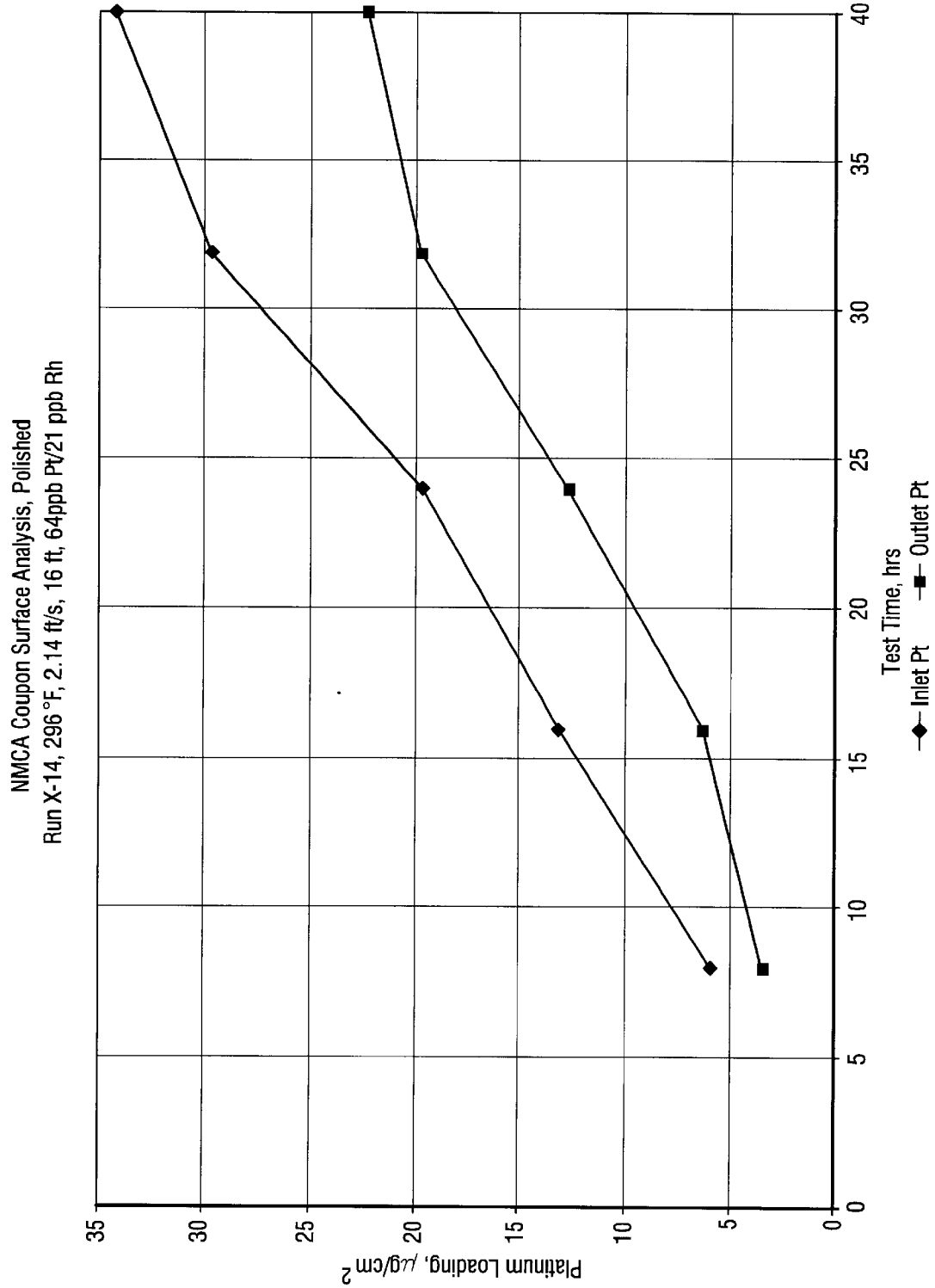
FIGS. 7A and 7B show the platinum and rhodium loading as a function of time.
Figure 7B:
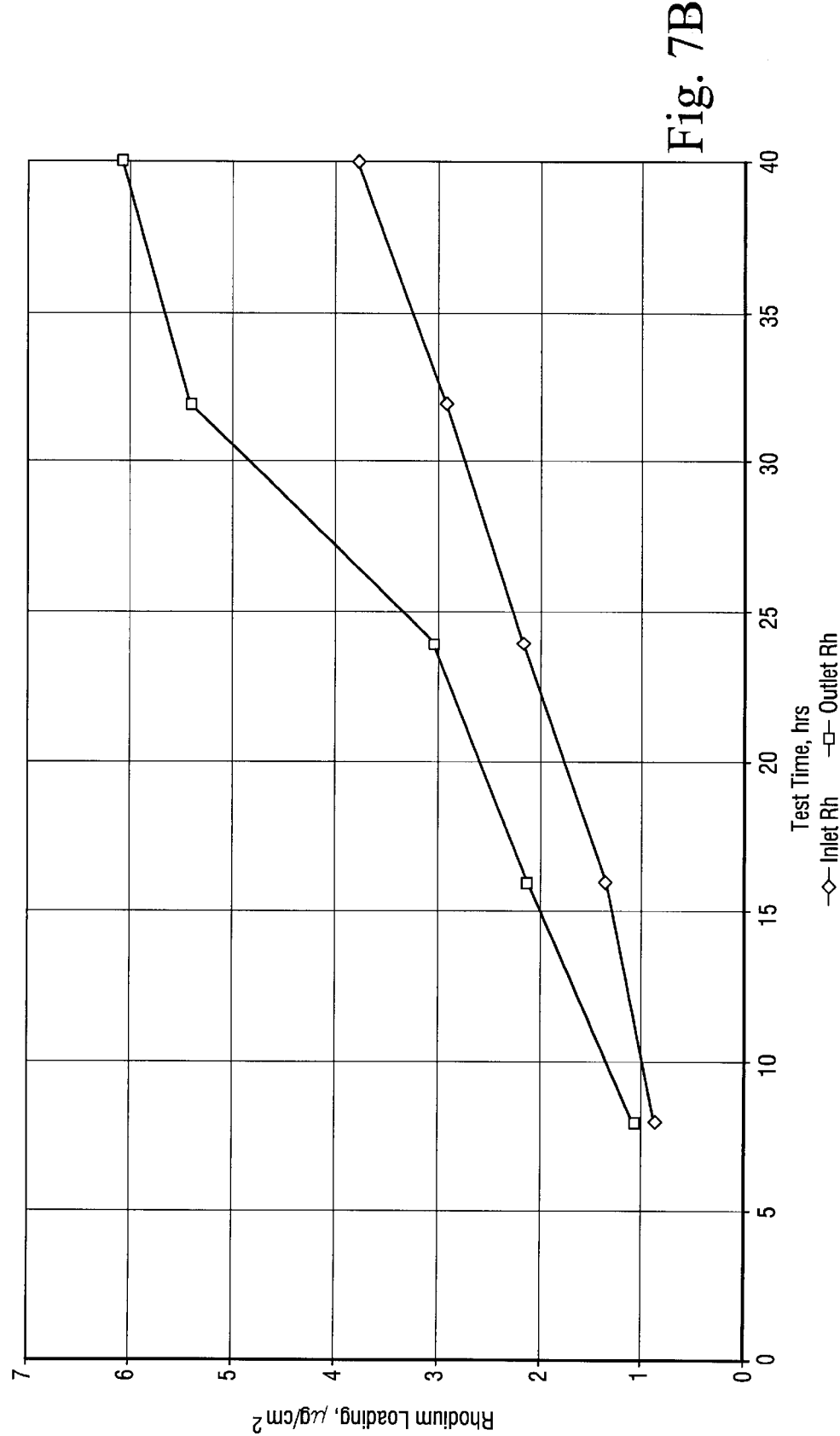

FIGS. 7A and 7B show the deposition of platinum and rhodium is approximately linear with time.

The bulk concentration of platinum and rhodium, time and temperature are the variables that can be used to produce a desired platinum to rhodium deposit ratio and total noble metal loading.

The process of the present invention is distinguished from the processes of U.S. Pat. Nos. 5,130,080 and 5,130,181 to Niedrach. The Niedrach patents teach that it is possible to electrolessly plate oxide films using conventional electroless plating techniques. Conventional electroless plating is carried out at relatively low temperatures, typically in the region of 50 to 80° C., possibly lower, and requires the presence of an added reducing agent, typically sodium hypophosphite, to supply electrons for reduction of the noble metal ions to the metal. The reaction takes place only on a catalytic surface which has been sensitized/activated beforehand, for example with stannous chloride, and the process results in a build-up of metal coating on the surface which eventually coats the entire surface with deposited metal. The electroless plating bath typically contains high ionic concentrations, of the order of thousands of ppm, of chemicals, including, for example, palladium (II) chloride, ammonium hydroxide, ammonium chloride, disodium EDTA and hydrazine, as well as a reducing agent (e.g. sodium hypophosphite). The pH of the electroless bath is usually in the region of 9.0 to 10.5 in view of the presence of base (ammonium hydroxide and ammonium chloride).

The process of the present invention does not rely on the use of electroless plating techniques or other techniques which result in the metal being plated on the oxide surface. In the present process, the metal compound or mixture of metal compounds is introduced into the high-temperature water in an amount such that the concentration of the metal(s) in the water is very low, i.e. in the ppb range, but is sufficient such that when present on the metal component, the ECP is lowered below the critical potential required for protection from stress corrosion cracking. Typically, the metal compound is added in such an amount to produce a metal concentration of no higher than 2000 ppb, for example 0.1 to 1000 ppb, typically 1 to 500 ppb, more usually 5 to 100 ppb.

The compound solution or suspension may be injected into the high-temperature water while the reactor is operating and generating nuclear heat (full power operation), or during cool down, during outage, during heat-up, during hot standby, or during low power operation. The noble metal may be introduced into residual heat removal (RHR) piping, recirculation piping, feedwater line, core delta P line, jet pump instrumentation line, control rod drive cooling water lines, water level control points, or any other location which provides introduction of the noble metal into the reactor water and good mixing with the water. As used herein, the term "high-temperature water" in the present invention means water having a temperature of about 200° F. or greater, steam, or the condensate thereof. High temperature water can be found in a variety of known apparatus, such as water deaerators, nuclear reactors, and steam-driven power plants. The temperature of the water when noble metal is added to the reactor water is typically in the range of 200–500° F., for example 200–450° F., more usually about 340°–360° F. When the compound is in the high-temperature water, it decomposes very rapidly and the metal atoms are incorporated in the oxide surface.

At the very low levels of metal(s) introduced into the reactor, the stainless steel oxide surface is not covered completely with metal. Typically, the oxide surface has metal present in an amount of about 0.1–15 atomic %, for example 0.5–10 atomic %, more usually 2–5 atomic %.

The depth of metal in the oxide surface is generally in the range of 100 to 1000 Angstroms, more usually 200 to 500 Angstroms. The external appearance of the oxidized alloy treated according to the present process does not differ from the appearance of untreated stainless steel oxide. The noble metal containing surface does not have a bright metallic luster as is generally obtained with electroplating or electroless coating processes.

In the present process, only very dilute compound solution or suspension is injected into the high-temperature water. No reducing agents (including hydrogen), acids and bases, are added. As a result, the typical pH of the water at ambient temperature is in the region of 6.5 to 7.5, and at higher operating temperatures is lower, generally in the region of about 5.5–5.8, for example 5.65. This is due to increased dissociation of the water at the higher temperatures.

An operating BWR has very stringent coolant water conductivity levels which must be observed. Typically, the conductivity of the coolant water must not exceed 0.3 $\mu$S/cm, and more usually must be less than 0.1 $\mu$S/cm. Such conductivity levels are adversely impacted by high concentrations of ionic species, and every effort is made in the present process to ensure that reactor ionic concentrations are maintained as low as possible after clean-up, preferably less than 5 ppb. The process in particular excludes the use of chloride ion in view of its corrosive nature.

The present process does not involve any catalytic activation/sensitization of the stainless steel oxide surface. The use of stannous chloride to achieve such activation would be incompatible with operation of the BWR and the stringent conductivity limits on the coolant water referred to above.

While not being bound by theory, it is understood that the metal, for example platinum and/rhodium, is incorporated into the stainless steel oxide film via a thermal decomposition process of the compound wherein metal ions/atoms apparently replace iron, nickel and/or chromium atoms in the oxide film, resulting in a metal-doped oxide film. The metal, such as platinum/rhodium, may for example be incorporated within or on the surface of the oxide film and may be in the form of a finely divided metal. The oxide film is believed to include mixed nickel, iron and chromium oxides.

The ECPs of the stainless steel components all drop by approximately 0.30 V after injection of the noble metal and subsequent addition of low levels of hydrogen. It is possible to reduce the ECP of Type 304 stainless steel to IGSCC protection values without injecting hydrogen when an organic metal compound has been injected into the water. The catalytic oxidation of organics on noble metal-doped surfaces consumes oxygen, thereby lowering the dissolved oxygen content in the high temperature water. Good results are also obtained when an inorganic metal compound(s) is used. Moreover, clean-up of the water is easier when inorganic(s) such as nitrates are used as compared to organics such as formates and acetates. For this reason, inorganic compounds, particularly inorganic platinum group metal compounds (e.g. noble metal nitrates and nitrites), are typically used.

Following injection and incorporation of the metal(s) in the oxidized stainless steel surfaces, the water is subjected to a conventional clean-up process to remove ionic materials such as nitrate ions present in the water. This clean-up process is usually carried out by passing a fraction of the water removed from the bottom head of the reactor and recirculation piping through an ion exchange resin bed, and the treated water is then returned to the reactor via the feedwater system. Hydrogen may subsequently be introduced into the water some time after the doping reaction, for example 1 to 72 hours after injection and incorporation of the metal atoms in the oxidized surface, to catalyze recombination of hydrogen and oxygen on the metal doped surfaces. As hydrogen is added, the potential of the metal-doped oxide film on the stainless steel components is reduced to values which are much more negative than when hydrogen is injected into a BWR having stainless steel components which are not doped with the noble metal.

The noble metal-containing compound is injected in situ into the high-temperature water of a BWR in an amount such as to produce, upon decomposition of the compound, a metal concentration of up to 2000 ppb, for example about 1 to 850 ppb, more usually 5 to 100 ppb. Preferably, the palladium compound is injected at a point downstream of the recirculation water outlet 43 (see FIG. 1). The high temperatures as well as the gamma and neutron radiation in the reactor core act to decompose the compound, thereby freeing noble metal ions/atoms for deposition on the surface of the oxide film. As used herein, the term "atoms" means atoms or ions.

It has been shown in other commonly assigned cases, for example U.S. Ser. No. 08/635,539, filed Apr. 22, 1996 (herein incorporated by reference) that palladium treatment in accordance with the invention, the ECP value of the stainless steel surfaces remains quite negative and below the required IGSCC protection potential of −0.230 V(SHE) even without the addition of any hydrogen when organics are present in the water.

The noble metal injection solution may be prepared for example by dissolving the noble metal compound in ethanol.

The ethanol solution is then diluted with water. Alternatively, a water-based suspension can be formed, without using ethanol, by mixing the noble metal compound in water.

The noble metal either deposits or is incorporated into the stainless steel oxide film via a thermal decomposition process of the noble metal compound. As a result of that decomposition, noble metal ions/atoms become available to replace atoms, e.g., iron atoms, in the oxide film, thereby producing a noble metal-doped oxide film on stainless steel.

The present invention offers the advantage that steel surfaces can be doped with noble metal using an in situ technique (while the reactor is operating) which is simple in application and also inexpensive. However, the technique is not limited to in situ application. The application technology can be implemented even for doping ex situ components. The technique can be applied to operating BWRs and PWRs and their associated components, such as steam generators. In practice, the noble metal concentration in the reactor water is preferably in the range of 1 to 1000 ppb, for example 2 to 900 ppb, more usually 5 to 100 ppb.

The foregoing method has been disclosed for the purpose of illustration. Variations and modifications of the disclosed method will be readily apparent to practitioners skilled in the art of hydrogen water chemistry. For example, metals other than platinum/rhodium can be applied using this technique, e.g., other platinum group metals. A platinum group metal can be injected in the form of an organic, organometallic or inorganic compound to reduce the potential of stainless steel reactor components even in the absence of hydrogen injection. Alternatively, the platinum group metal can be injected in the form of an inorganic compound to reduce the potential of stainless steel reactor components. It may also be possible to dope oxide films on stainless steel components with non-platinum group metals, e.g., zirconium and titanium, using the technique of the invention. All such variations and modifications are intended to be encompassed by the claims set forth hereinafter.

What is claimed is:

1. A method for controlling the amount of metal atoms deposited into an oxide film present on a metal surface, which metal atoms increase the corrosion resistance of metal when present in the oxide film, said method comprising the steps of:

submerging the metal surface in water at a selected temperature within the range of about 340 to 360° F.; and injecting a solution of a compound containing the metal which increases the corrosion resistance of the metal surface when present in the oxide film, said compound decomposing at said selected temperature to release atoms of the metal which incorporate in the oxide film.

2. The method as defined in claim 1, wherein said metal atoms are deposited in an amount which ranges from 0.01 $\mu g/cm^2$ to about 62 $\mu g/cm^2$.

3. The method as defined in claim 1, wherein said compound is added to said water in an amount sufficient to produce a metal concentration of 0.1 to 1000 ppb.

4. The method as defined in claim 1, wherein said metal is present in said oxide film in an amount of 0.1–15 atomic %.

5. The method as defined in claim 1, wherein said metal is a platinum group metal.

6. The method as defined in claim 4, wherein said platinum group metal is palladium.

7. The method as defined in claim 4, wherein a mixture of platinum and rhodium is used.

8. The method as defined in claim 1, wherein the compound is selected from the group consisting of palladium acetyl acetonate, palladium nitrate, palladium acetate, platinum acetyl acetonate, hexahydroxyplatinic acid, $Na_2Pt(OH)_6$, $Pt(NH_3)_4(NO_3)_2$, $K_3Ir(NO_2)_6$, $K_3Rh(NO_2)_6$, platinum(IV) oxide, platinum(IV) oxide-hydrate, rhodium (II) acetate, Rh(III) nitrate, rhodium(III) oxide, rhodium(III) oxide-hydrate, rhodium(II) phosphate, rhodium(III) sulphate, and mixtures thereof.

9. The method as defined in claim 1, further comprising the step of injecting hydrogen into the water of said reactor.

10. A method for reducing corrosion of alloy components in a water-cooled nuclear reactor or associated components, comprising the step of injecting a solution of a compound containing a metal into the water of said reactor, said water being at a selected temperature within the range of 340–360° F., said compound undergoing decomposition at said selected temperature to release atoms of said metal compound at a rate such that the concentration of said metal in the water of said reactor is sufficient, once doped on said alloy components, to reduce the electrochemical corrosion potential of said alloy components to a level below the critical potential to protect against intergranular stress corrosion cracking.

11. A method for improving the corrosion resistance of an alloy surface having an oxide film thereon, comprising the step of immersing said alloy surface in water at a temperature within the range of 340 to 360° F. in which a compound containing a metal is dissolved, said metal having the property of increasing the corrosion resistance of said alloy when incorporated in said oxide film, said compound having the property that it decomposes in said water to release atoms of said metal which incorporate in said oxide film.

12. The method as defined in claim 11, wherein said metal is a platinum group metal.

13. The method as defined in claim 12, wherein said platinum group metal is selected from the group consisting of platinum and rhodium.

14. The method as defined in claim 11, wherein said compound is selected from the group consisting of palladium acetyl acetonate, palladium nitrate, palladium acetate, platinum acetyl acetonate, hexahydroxyplatinic acid, $Na_2Pt(OH)_6$, $Pt(NH_3)_4(NO_3)_2$, $Pt(NH_3)_2(NO_3)_2$, $K_3Ir(NO_2)_6$, $K_3Rh(NO_2)_6$, platinum(IV) oxide, platinum(IV) oxide-hydrate, rhodium(II) acetate, Rh(III) nitrate, rhodium(III) oxide, rhodium(III) oxide-hydrate, rhodium(II) phosphate, rhodium(III) sulphate, and mixture thereof.

15. The method as defined in claim 11, wherein said compound is injected at a rate such that the concentration of said metal in the water is sufficient, once doped on said alloy components, to reduce the electrochemical corrosion potential of said alloy components in the presence of low levels of hydrogen to a level below the critical potential to protect against intergranular stress corrosion cracking.

16. The method as defined in claim 11, further comprising the step of injecting hydrogen into the water.

17. The method as defined in claim 11, wherein palladium is added to said water in an amount sufficient to produce a palladium concentration of 0.1 to 1000 ppb.

18. A method for controlling the deposit ratio of different noble metals from a mixture of said noble metals on a metal surface carrying an oxide film, comprising the steps of immersing said metal surface in water at a temperature within the range of 340 to 360° F. and introducing a mixture of compounds containing said different noble metals, said compounds each having the property of decomposing in said water to release atoms of said different noble metals which incorporate in said oxide film at a desired deposit ratio.

19. The method as defined in claim 18, wherein said noble metals are platinum and rhodium and the deposit ratio of platinum to rhodium is about 5:1 and 10:1.

* * * * *